Figure 1:
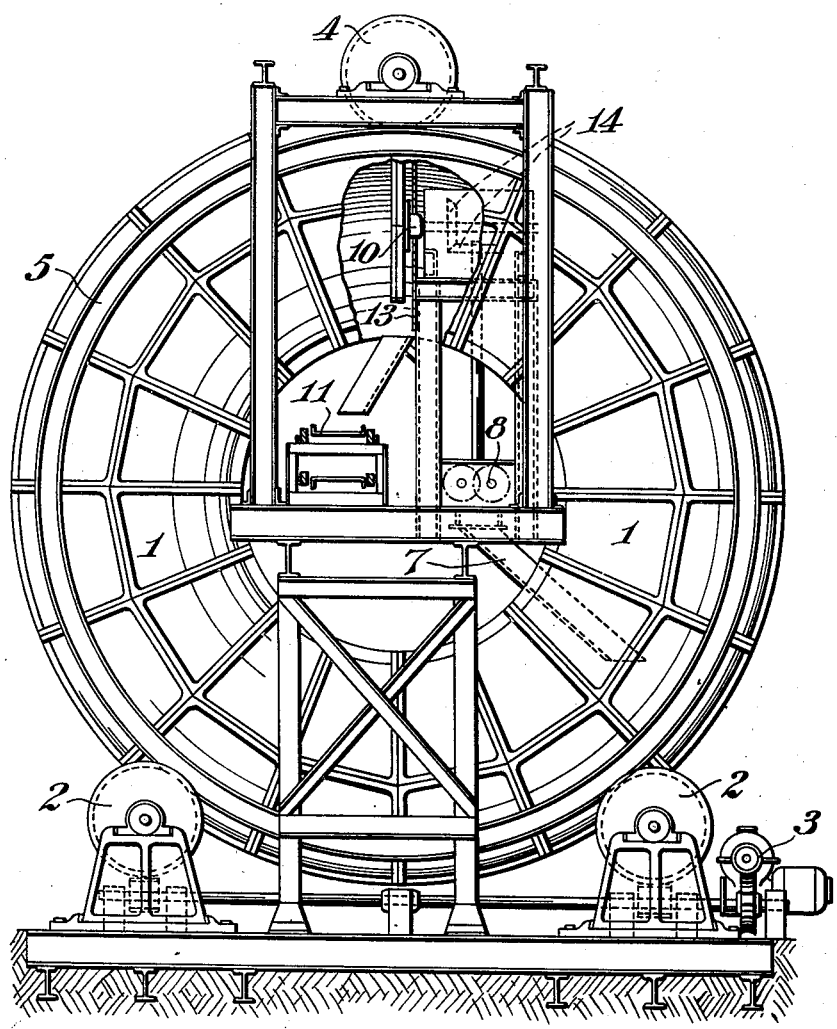

Nov. 30, 1937.  A. WILSON  2,100,583
APPARATUS FOR PREPARING SUPERPHOSPHATE
Filed Jan. 13, 1936  3 Sheets-Sheet 1

INVENTOR.
ARTHUR WILSON.
BY Benj. T. King
ATTORNEY.

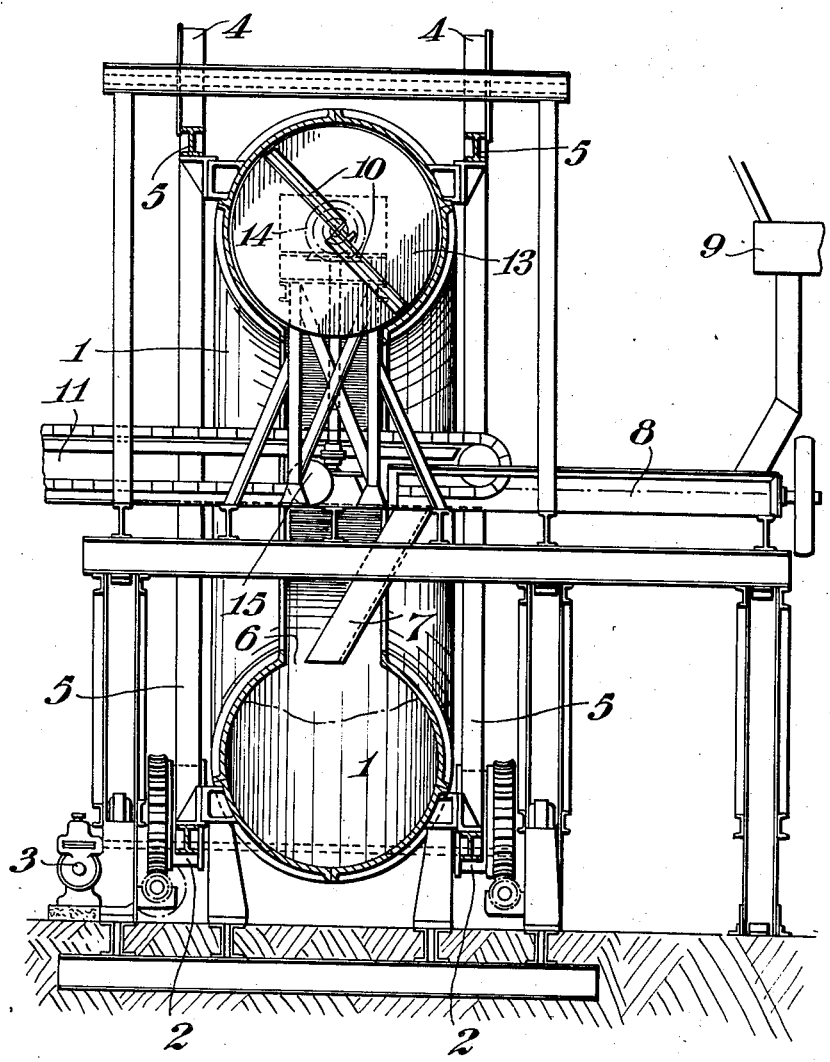

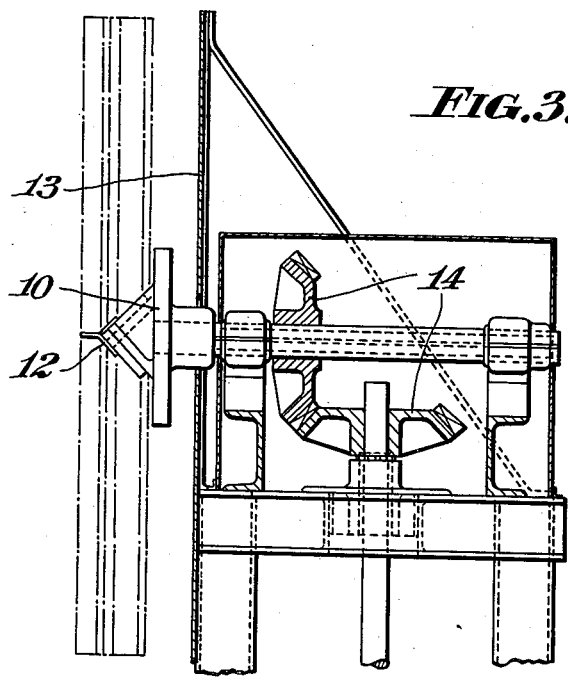
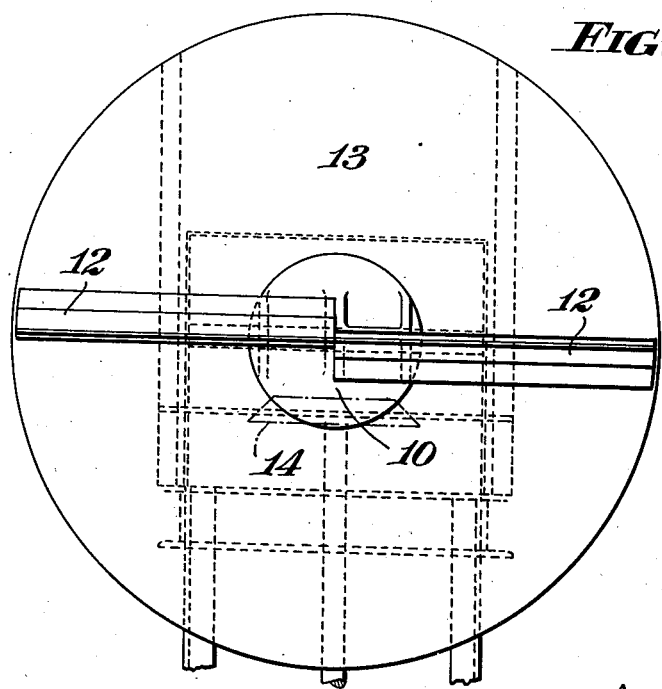

Patented Nov. 30, 1937

2,100,583

UNITED STATES PATENT OFFICE 2,100,583

APPARATUS FOR PREPARING SUPERPHOSPHATE

Arthur Wilson, Silloth, England, assignor to J. & W. Maxwell Limited, Carlisle, England Application January 13, 1936, Serial No. 58,956
In Great Britain January 30, 1935

1 Claim. (Cl. 23—259.2)

This invention relates to a continuous rotary mixing machine, primarily for use in the production of superphosphate, but applicable in general to similar manufacturing processes in the chemical and allied industries.

The object of the present invention is to provide a mixing machine for the mechanical production of superphosphate or other similarly prepared substances in which all stages of the operation for converting the raw materials into the finished product are effected in the machine by a single continuous process, thus reducing labour costs and eliminating stopping and starting expenses.

The machine consists broadly of a hollow, substantially ring-like chamber into the interior of which mixed materials are delivered, the chamber being rotated about its central axis so as to advance the materials within the chamber toward and into contact with a stationary slicing, shredding or similar appliance for breaking down the massed material. The sliced, shredded, or powdered material is conveniently discharged onto a suitable conveyor or into a transportable receptacle.

An embodiment of the invention is illustrated in the accompanying drawings, wherein:—

Figures 1 and 2 are an elevation and transverse vertical section respectively; and, Figures 3 and 4 are sectional side elevation and front elevation respectively of the slicing appliance.

In the machine illustrated, which is primarily intended for the production of superphosphate, the hollow ring-like chamber 1 is disposed with its central axis horizontally disposed and is supported on two pairs of rollers 2 which are driven through toothed gearing by an electric motor 3 so as to effect rotation of the chamber 1 about its horizontal axis. Guiding or steadying rollers 4 are located at the top of the chamber, and these rollers 4 and the supporting rollers 2 are flanged for engagement with circular rails 5 mounted on the outer peripheral surface of the chamber 1. The chamber 1 is of C-shape in cross-section (see Figure 2) with the mouth 6 of the C innermost, so that the delivery chute 7 of a mixing machine 8 can enter the interior of the chamber 1 for the purpose of depositing mixed materials therewithin. This mixing machine 8 is of known horizontal trough form having a pair of longitudinally disposed parallel shafts fitted with propelling and mixing blades. The longitudinal axis of the trough of the mixing machine 8 is disposed level with and parallel to the axis of rotation of the chamber 1.

Batches of ground rock phosphate and sulphuric acid in predetermined quantities and proportion are fed from an automatic weighing or measuring machine 9 to the outer end of the mixing machine 8, whilst a chute 7 for delivering mixed materials to the chamber 1 is provided at the inner end thereof. The mixed acid and phosphate are continuously deposited in the chamber 1 as said chamber slowly rotates (approximately one revolution every four hours), the rotating chamber 1 carrying the mixture up against the blades of a revolving cutter 10 which slices or removes the continually advancing front end of the moving mass and allows the material removed to fall in a powdered condition onto a belt conveyor 11. The cutter 10 (Figures 3 and 4) aforesaid consists of two or more blades 12 rotating about a horizontal axis which is substantially in alignment with the circular centre line of the ring-like chamber 1 and in a plane which coincides with a vertical line passing through the axis of rotation of the chamber. A circular screen 13 is located behind the cutter 10, the spindle of which is driven through toothed gearing 14 by an electric motor 15. The powdered substance falls from the surface of the cutter blades 12 down through the mouth 6 in the C-section chamber 1 onto the conveyor 11 which is located within the space at the centre of the chamber.

In the construction illustrated the rollers 2 frictionally drive the chamber 1, but if desired toothed gearing could be employed, for example, the rollers 2 and the rails 5 could be toothed or a ring of teeth could be provided at the crest of the periphery of the chamber, these teeth being in mesh with a rotatable worm gear or the equivalent located beneath or at the side of the chamber.

I claim:

A machine for the manufacture of superphosphate and like products comprising a reaction chamber in the form of a hollow ring of substantially circular cross section, vertically disposed and rotatable about its central longitudinal axis, said chamber having end walls rigid with each other and also having an inner opening coextensive circumferential therewith, means for rotating said chamber, means for feeding solidifiable material to said chamber through the said inner opening thereof, said inner opening being of lesser width than the maximum width of the reaction chamber whereby the latter is effective to support the solidified material as it is carried with said chamber to the top thereof, means within said chamber at the top thereof for comminuting the solidified material as it is advanced by said chamber, and a conveyor disposed beneath said comminuting means and near the axis of rotation of the chamber to receive comminuted material falling from said comminuting means through said inner opening.

ARTHUR WILSON.